(12) United States Patent
Kim

(10) Patent No.: US 11,772,094 B2
(45) Date of Patent: Oct. 3, 2023

(54) MICROFLUIDIC APPARATUS AND METHOD FOR SEPARATING TARGET CELLS USING THE SAME

(71) Applicant: Daegu Gyeongbuk Institute of Science and Technology, Daegu (KR)

(72) Inventor: Min Seok Kim, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 687 days.

(21) Appl. No.: 16/827,448

(22) Filed: Mar. 23, 2020

(65) Prior Publication Data

US 2020/0246797 A1  Aug. 6, 2020

Related U.S. Application Data

(63) Continuation of application No. PCT/KR2019/015677, filed on Nov. 15, 2019.

(30) Foreign Application Priority Data

Nov. 15, 2018  (KR) .................. 10-2018-0140887

(51) Int. Cl.
*C12N 5/09* (2010.01)
*C12N 15/10* (2006.01)
(Continued)

(52) U.S. Cl.
CPC .... *B01L 3/502753* (2013.01); *B01D 21/0009* (2013.01); *B01D 21/262* (2013.01);
(Continued)

(58) Field of Classification Search
CPC ......... B01L 3/502753; B01L 3/502738; B01D 21/0009; B01D 21/262; B03C 1/01; B03C 1/288; B03C 1/30
See application file for complete search history.

(56) References Cited

U.S. PATENT DOCUMENTS

2008/0102537 A1* 5/2008 Harding ............ B01L 3/502761
436/514
2008/1741400 7/2008 Cho et al.
(Continued)

FOREIGN PATENT DOCUMENTS

CN    103852354    6/2014
CN    106662596    5/2017
(Continued)

OTHER PUBLICATIONS

Chinese Patent Office, Office Action for Chinese Patent Application No. 201980075510.6 dated May 20, 2022.
(Continued)

*Primary Examiner* — Brian R Gordon
*Assistant Examiner* — Dwan A Gerido
(74) *Attorney, Agent, or Firm* — LEX IP MEISTER, PLLC

(57) ABSTRACT

Provided are a microfluidic apparatus and a method for separating a target cell using the same. The microfluidic apparatus for separating a first material in a biological sample from the biological sample, according to an embodiment of the disclosure, includes: a body rotatable on a rotation axis; a mixing chamber included in the body, wherein the biological sample and magnetic beads that are combined with a second material in the biological sample are mixed in the mixing chamber; a separation chamber included in the body and connected to the mixing chamber, wherein a mixed sample of the first material and the second material combined with the magnetic beads is separated in the separation chamber; and a magnetic member positioned on one side of the body outside the separation chamber, wherein, in the separation chamber, the first material is separated from the second material combined with the magnetic beads by a centrifugal force and a magnetic force.

7 Claims, 5 Drawing Sheets

(51) Int. Cl.
*B01L 3/00* (2006.01)
*B01D 21/00* (2006.01)
*B01D 21/26* (2006.01)
*B03C 1/01* (2006.01)
*B03C 1/28* (2006.01)
*B03C 1/30* (2006.01)

(52) U.S. Cl.
CPC .......... *B01L 3/502738* (2013.01); *B03C 1/01* (2013.01); *B03C 1/288* (2013.01); *B03C 1/30* (2013.01); *B01L 2200/0647* (2013.01); *B01L 2300/047* (2013.01); *B01L 2400/06* (2013.01); *B03C 2201/18* (2013.01); *B03C 2201/26* (2013.01)

(56) References Cited

U.S. PATENT DOCUMENTS

| | | |
|---|---|---|
| 2008/0300148 A1 | 12/2008 | Lee et al. |
| 2011/0124128 A1 | 5/2011 | Oosterbroek et al. |
| 2014/0154664 A1* | 6/2014 | Kim .................. C12N 15/1006 435/308.1 |
| 2016/0209409 A1 | 7/2016 | Choi |
| 2017/0168046 A1 | 6/2017 | Saiki et al. |

FOREIGN PATENT DOCUMENTS

| | | |
|---|---|---|
| EP | 1900432 | 3/2008 |
| EP | 2002895 | 12/2008 |
| EP | 2253958 | 11/2010 |
| EP | 2740536 | 6/2014 |
| EP | 3163307 | 5/2017 |
| JP | 2011-7778 | 1/2011 |
| KR | 10-0754409 | 8/2007 |
| KR | 10-2008-0106779 | 12/2008 |
| KR | 10-2014-0071814 | 6/2014 |

OTHER PUBLICATIONS

Korean Office Action for 10-2018-0140887, dated Sep. 27, 2019, 5 pp. (no translation available).

* cited by examiner

MICROFLUIDIC APPARATUS AND METHOD FOR SEPARATING TARGET CELLS USING THE SAME

CROSS-REFERENCE TO RELATED APPLICATIONS

This application claims benefit as a Continuation of PCT application serial No. PCT/KR2019/015677 filed on Nov. 15, 2019, and to Korean Patent Application No. 10-2018-0140887 filed on Nov. 15, 2018 in the Korean Intellectual Property Office, where the disclosure of each is incorporated herein in its entirety by reference.

TECHNICAL FIELD

The disclosure relates to a microfluidic apparatus capable of separating a target cell in a biological sample, and a method of separating a target cell using the microfluidic apparatus.

BACKGROUND ART

An apparatus for transferring a fluid in a microfluidic structure is referred to as a microfluidic apparatus. The microfluidic apparatus is used as a clinical diagnostic analysis apparatus that enables a user to easily and cheaply detect a small amount of a target material in a fluid. To transfer a fluid in the microfluidic apparatus, driving pressure is needed, and capillary pressure or pressure generated by a pump is used as driving pressure.

Recently, as such a microfluidic apparatus, a microfluidic apparatus using a centrifugal force by placing a microfluidic structure on a circular, disc-shaped, rotatable platform, that is, a Lab-on-a-Disk or a Lab CD, has been proposed.

The Lab-on-a-Disc, which means a 'laboratory on a disc', is used to implements various experiment processes performed in a laboratory, for example, separation, purification, mixing, labeling, analysis, washing, etc. of samples on a small-sized chip. The Lab-on-a-Disc integrates various kinds of equipment of a laboratory, which are required for analyzing biological molecules, into a CD shaped apparatus.

By injecting a biological sample such as blood into a microfluidic structure provided on a disc, it is possible to transfer a fluid, such as a sample or a reagent, by using only a centrifugal force and without using a driving system for applying driving pressure for transferring the fluid.

However, when a target material is a material such as a neuron cell which is sensitive to an external force such as a centrifugal force, there is a high risk that the target material will be damaged due to the centrifugal force applied for a long time in order to separate a small amount of the target material in a fluid, such as a sample, a reagent, etc., by transferring the fluid using only the centrifugal force. Therefore, it is difficult to separate a target cell using only a centrifugal force.

DESCRIPTION OF EMBODIMENTS

Technical Problem

An embodiment of the disclosure provides a microfluidic apparatus capable of easily and quickly separating a target cell sensitive to an external force such as a centrifugal force, and a method of separating a target cell using the microfluidic apparatus.

Also, provided are a microfluidic apparatus capable of separating a target cell sensitive to an external force under a condition of minimizing a centrifugal force to maximize the activity of the target cell and enhance separating efficiency, and a method of separating a target cell using the microfluidic apparatus are provided.

Solution to Problem

According to an aspect of the disclosure, there is provided a microfluidic apparatus for separating a first material in a biological sample from the biological sample, the microfluidic apparatus including: a body rotatable on a rotation axis; a mixing chamber included in the body, wherein the biological sample and magnetic beads that are combined with a second material in the biological sample are mixed in the mixing chamber; a separation chamber included in the body and connected to the mixing chamber, wherein a mixed sample of the first material and the second material combined with the magnetic beads is separated in the separation chamber; and a magnetic member positioned on one side of the body outside the separation chamber, wherein, in the separation chamber, the first material is separated from the second material combined with the magnetic beads by a centrifugal force and a magnetic force.

Advantageous Effects of Disclosure

A microfluidic apparatus according to an embodiment of the disclosure may separate a target cell while minimizing an external force by a centrifugal force by separating the target cell by using both the centrifugal force and a magnetic force, thereby maximizing activity of a target cell that is sensitive to an external force such as a centrifugal force.

Also, the microfluidic apparatus according to an embodiment of the disclosure may separate a target cell quickly by separating the target cell by using both a centrifugal force and a magnetic force.

Also, the microfluidic apparatus according to an embodiment of the disclosure may enhance separating efficiency of a target cell under a condition of a minimum centrifugal force.

BRIEF DESCRIPTION OF DRAWINGS

FIGS. 3A, 3B, and 3C show a process of separating a target cell in a sample, wherein FIG. 3A shows a state in which a sample including a first material and a second material combined with magnetic beads is positioned inside a separation chamber, FIG. 3B shows a state in which the first material has been separated from the second material combined with the magnetic beads inside the separation chamber, and FIG. 3C shows a state in which the first material has moved to an inside of a storage chamber.

BEST MODE

Figure 1:
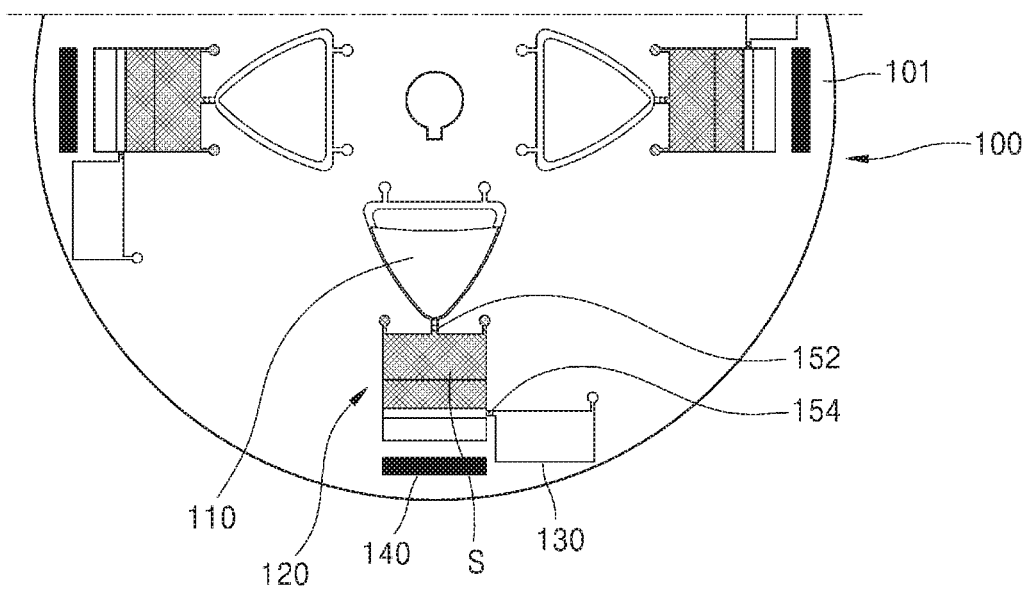
FIG. 1 is a configuration diagram of a microfluidic apparatus according to an embodiment of the disclosure.

According to an aspect of the disclosure, there is provided a microfluidic apparatus for separating a first material in a biological sample from the biological sample, the microfluidic apparatus including: a body rotatable on a rotation axis; a mixing chamber included in the body, wherein the biological sample and magnetic beads that are combined with a second material in the biological sample are mixed in the mixing chamber; a separation chamber included in the body and connected to the mixing chamber, wherein a mixed sample of the first material and the second material combined with the magnetic beads is separated in the separation chamber; and a magnetic member positioned on one side of the body outside the separation chamber, wherein, in the separation chamber, the first material is separated from the second material combined with the magnetic beads by a centrifugal force and a magnetic force.

The microfluidic apparatus may further include a first valve installed in a first channel connecting the mixing chamber to the separation chamber.

The separation chamber may be positioned farther away from the rotation axis than the mixing chamber.

The separation chamber may include: a first space; a second space farther away from the rotation axis than the first space; and a partition wall formed between the first space and the second space, wherein the partition wall includes an inclined surface inclined upward toward the first space.

The first material may be positioned in the first space, and the second material combined with the magnetic beads and separated from the first material by the centrifugal force and the magnetic force may be positioned in the second space.

The partition wall may include a top surface formed as a flat surface extending from a top edge of the inclined surface toward the second space.

The microfluidic apparatus may further include a storage chamber connected to the separation chamber, and storing the first material separated from the second material combined with the magnetic beads.

The microfluidic apparatus may further include a second valve installed in a second channel connecting the storage chamber to the separation chamber.

The second channel may be connected to a space above the partition wall.

The magnetic member may be positioned outside the separation chamber in a radial direction with respect to the separation chamber, at the same height as the separation chamber.

The magnetic member may include a permanent magnet or an electromagnet.

The first material may be a neuron cell.

The magnetic beads may have higher density than each of the first material and the second material.

The magnetic beads may be combined with the second material at a ratio of 1:50 to 1:100.

A density gradient medium having higher density than the first material and lower density than the magnetic beads may be included in the separation chamber.

The centrifugal force and the magnetic force may be applied radially outward of the rotation axis.

According to another aspect of the disclosure, there is provided a method of separating a first material in a biological sample, the method including: providing a sample including the first material; combining a second material that is different from the first material with magnetic beads in the sample; and applying a centrifugal force and a magnetic force to the first material and the second material combined with the magnetic beads, and separating the first material from the second material combined with the magnetic beads.

The method may further include transferring the first material separated from the second material combined with the magnetic beads to a separate space, and storing the first material in the separate space.

The combining of the second material with the magnetic beads and the separating of the first material from the second material combined with the magnetic beads may be performed in different spaces.

The combining of the second material that is different from the first material with the magnetic beads in the sample may include mixing the magnetic beads with the sample.

In the separating of the first material from the second material combined with the magnetic beads, the magnetic force applied to the second material may be applied in a direction away from a center of rotation of the second material.

The second material combined with the magnetic beads may be heavier than the first material.

The first material may be a neuron cell.

MODE OF DISCLOSURE

Hereinafter, embodiments of the disclosure will be described in detail with reference to the appended drawings in order for one of ordinary skill in the art to easily embody the disclosure. However, the disclosure may be implemented in various different forms, and is not limited to the embodiments described herein. In the drawings, parts irrelevant to the description are not shown in order to definitely describe the disclosure, and throughout the entire specification, the same or similar components are assigned like reference numerals.

Figure 2:
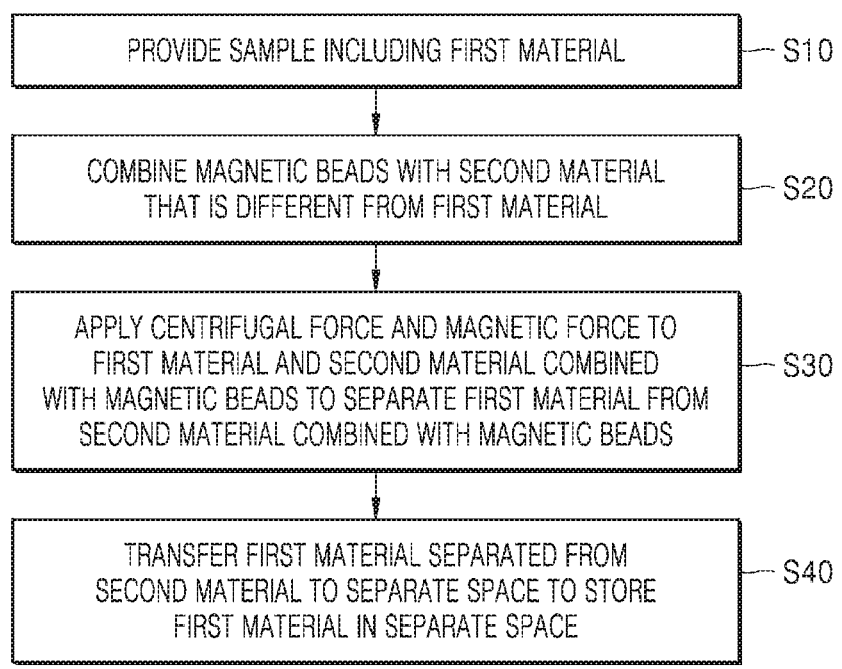
FIG. 2 is a flowchart showing a target cell separation method of separating a first material as a target cell by using a microfluidic apparatus according to an embodiment of the disclosure.
Figure 3A:
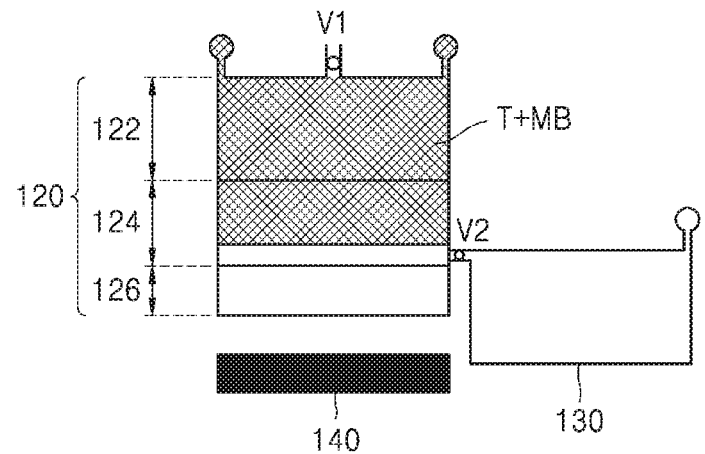
Figure 3B:
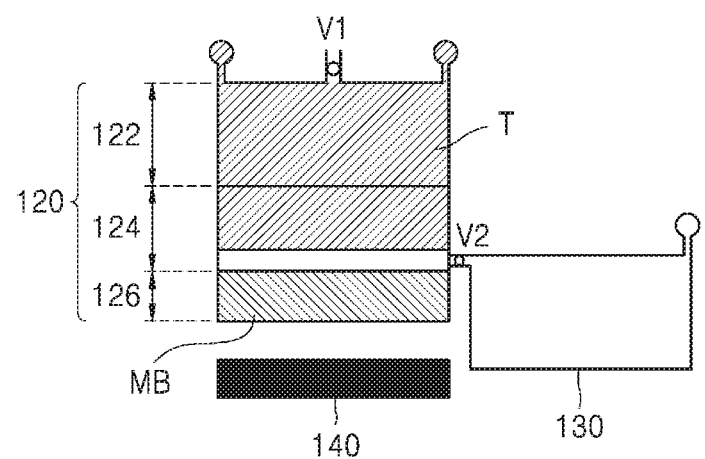
Figure 3C:
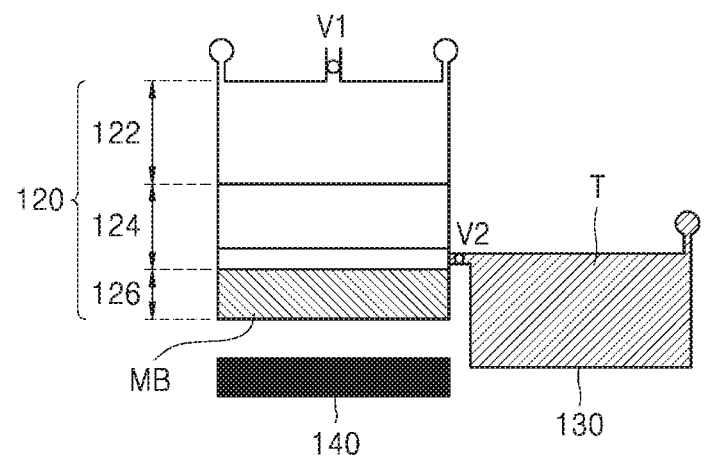
Figure 4A:
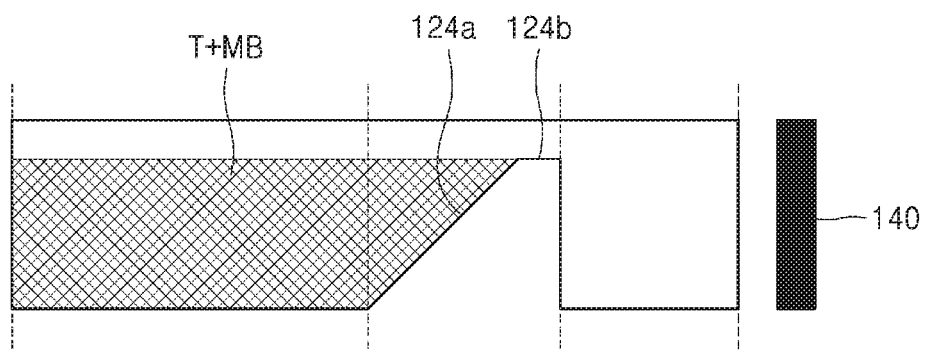
FIGS. 4A and 4B are cross-sectional views of FIGS. 3A and 3B, respectively.
Figure 4B:
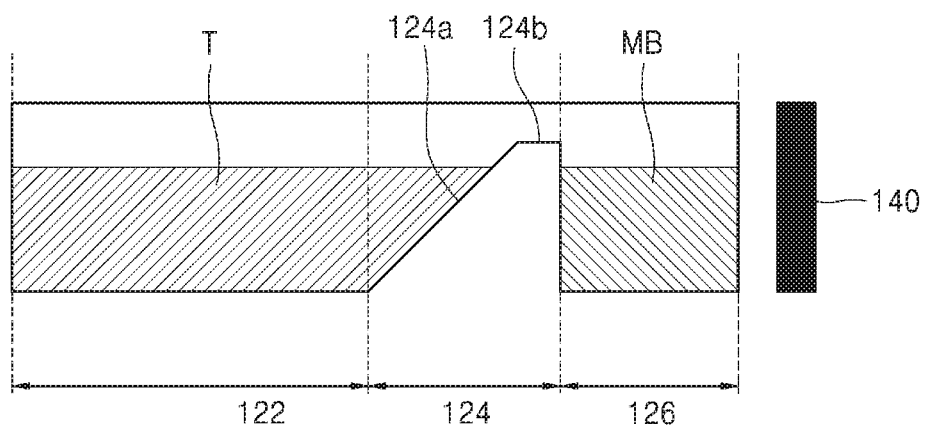
Figure 5A:
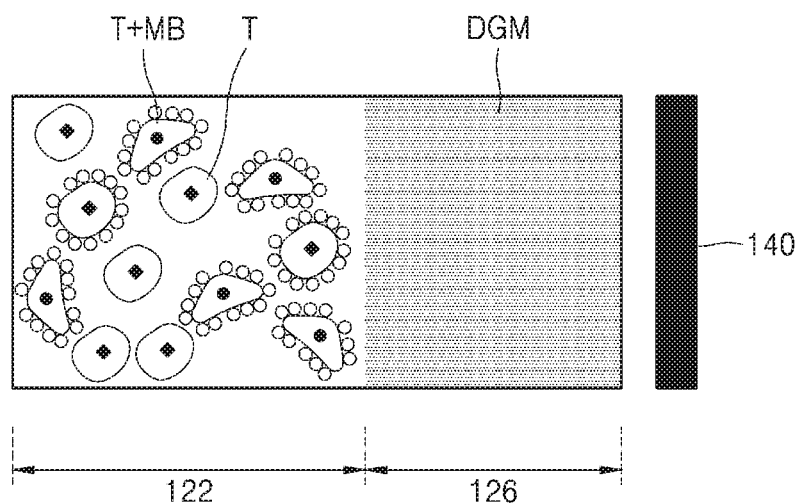
FIGS. 5A and 5B show another embodiment of FIG. 4.
Figure 5B:
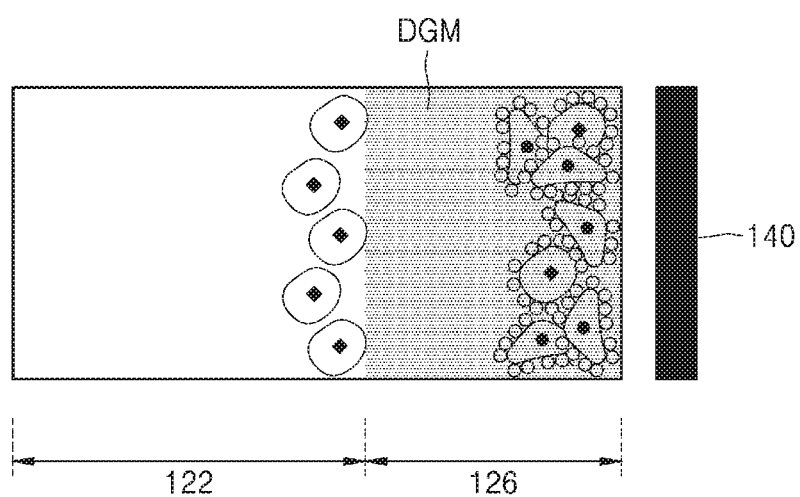
Figure 6:
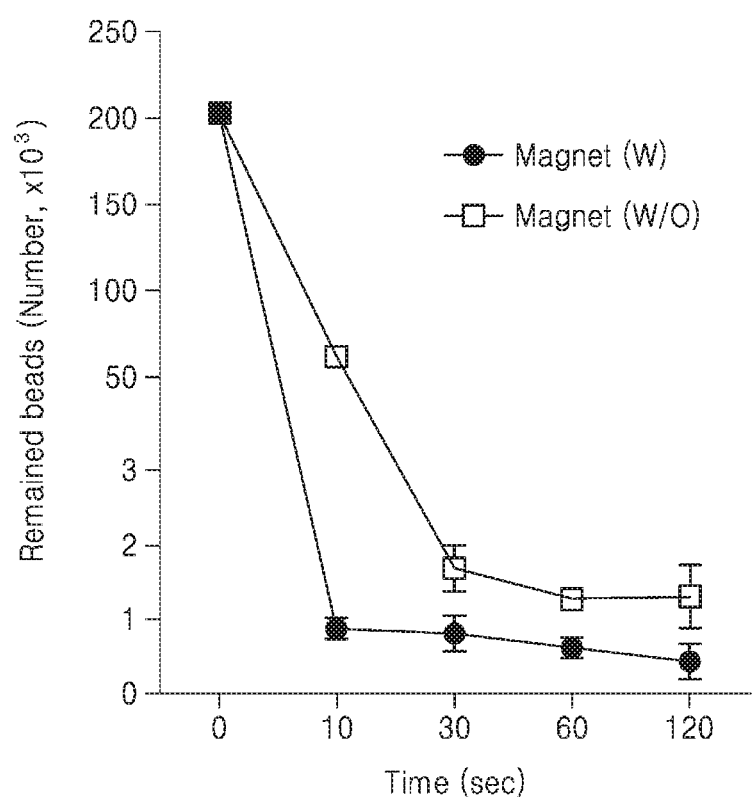
FIG. 6 is a graph for comparing a number of second materials combined with magnetic beads existing in a storage chamber after a target cell is separated when a magnet is used to a number of the second materials combined with the magnetic beads existing in the storage chamber after the target cell is separated when no magnet is used.

FIG. 1 is a configuration diagram of a microfluidic apparatus according to an embodiment of the disclosure. FIG. 2 is a flowchart showing a target cell separation method of separating a first material as a target cell by using the microfluidic apparatus according to an embodiment of the disclosure. FIGS. 3A, 3B, and 3C show a process of separating a target cell in a sample, wherein FIG. 3A shows a state in which a sample including a first material and a second material combined with magnetic beads is positioned inside a separation chamber. FIG. 3B shows a state in which the first material has been separated from the second material combined with the magnetic beads inside the separation chamber, and FIG. 3C shows a state in which the first material has moved to an inside of a storage chamber. FIGS. 4A and 4B are cross-sectional views of FIGS. 3A and 3B, respectively, FIGS. 5A and 5B show another embodiment of FIG. 4. FIG. 6 is a graph for comparing a number of the second material combined with the magnetic beads existing in the storage chamber after the target cell is separated when a magnet is used to a number of the second material combined with the magnetic beads existing in the storage chamber after the target cell is separated when no magnet is used.

Referring to FIG. 1, a microfluidic apparatus 100 according to an embodiment of the disclosure may include a body 101, a mixing chamber 110 provided in the body 101, a separation chamber 120, and a magnetic member 140.

The body 101 may be in the shape of a disc having a predetermined height, and rotatable by a rotating driver such as a motor (not shown). The motor may be coupled to a hole or groove formed in a center of the body 101, and rotation speed of the body 101 may be controlled by a controller for controlling the motor. By rotating the body 101 through the rotating driver, a centrifugal force for centrifuging a sample positioned in the body 101 and transferring a fluid may be provided.

The body 101 of the microfluidic apparatus 100 may be made of a plastic material, such as acryl or polydimethylsiloxane (PDMS), which is easily molded and has a biologically inert surface. However, a material of the body 101 is not limited to these as long as the body 101 is made of a material having biological safety, optical transparency, and machinability. The body 101 of the microfluidic apparatus 100 may be configured with several layers of plates. By forming an engraved structure corresponding to a chamber, a channel, etc. in a surface of a plate contacting another plate and bonding the plates, a space for accommodating a fluid and a passage for the fluid may be provided in the inside of the body 101 of the microfluidic apparatus 100.

For example, a top cover may be positioned above the body 101 of the microfluidic apparatus 100. Or, a 3-layer structure including a partition plate defining a microfluidic structure between the body 101 and the top cover may be provided. The top cover may be bonded to the body 101 by various methods, such as an adhesive, bonding using a double-sided adhesive tape, ultrasonic welding, laser welding, etc.

In the body 101 of the microfluidic apparatus 100, one or more microfluidic structures may be provided. For example, the body 101 of the microfluidic apparatus 100 may be divided into several areas, and microfluidic structures operating independently may be provided for the respective areas.

More specifically, referring to FIG. 1, the mixing chamber 110 may be included in the inside of the body 101. The mixing chamber 110 may be used to mix a sample S with magnetic beads. The sample S may be any biological sample Including a target cell T. For example, the sample S may be selected from a group including a biopsy sample, a tissue sample, a cell suspension obtained by suspending separated cells in a liquid medium, a cell culture, and a combination thereof. The sample S may be selected from a group including blood, a marrow fluid, saliva, a lachrymal fluid, sperm, a mucous membrane fluid, and a combination thereof. The sample S may include a first material which is a target cell T, and a second material which is different from the first material. The magnetic beads MB may be combined with the second material. In an embodiment of the disclosure, the first material may be a mammalian cell, more specifically, a neuron cell. More specifically, according to an embodiment, the first material and the second material may be acquired from a dorsal root ganglion obtained from tissue associated with a nerve. In this case, the first material may be a peripheral neuronal cell, and the second material may be a fibroblast, a Schwann cell, etc. However, the first material and the second material are not limited to these.

Surfaces of the magnetic beads MB may have been modified to an antibody or a metal oxide having affinity for the second material. The metal oxide may be selected from a group including $Al_2O_3$, $TiO_2$, $Ta_2O_3$, $Fe_2O_3$, $Fe_3O_4$, and $HfO_2$. Meanwhile, the magnetic beads MB may include one or more materials selected from a group including Fe, Ni, Cr, and an oxide thereof, which have ferromagnetism. As an embodiment of the disclosure, the magnetic beads MB may be attached to the second material by using a cell-specific surface expression difference. For example, by attaching a biotinylated CD-9 antibody and a biofinylated Bandeiraea simplicifolia lectin to 2.6 μm microbeads (Dynabeads™M-280 Streptavidin), the microbeads MB may be attached to the second material.

In the mixing chamber 110, an inlet into which the sample S is injected and an inlet into which the magnetic beads MB are injected may be formed. By preparing the sample S including the first material, injecting the sample S into the mixing chamber 110 (operation S10 of FIG. 2), then injecting the magnetic beads MB into the mixing chamber 110, and mixing the sample S with the magnetic beads MB, the magnetic beads MB may be positioned in the inside of the mixing chamber 110 in the state of being combined with the second material (operation S20 of FIG. 2). At this time, in order to combine the second material with the magnetic beads (MB) inside the mixing chamber 110, the body 101 may rotate at low speed to apply a centrifugal force to the sample S.

The mixing chamber 110 may be connected to the separation chamber 120. The separation chamber 120 may be positioned farther away from a center of rotation of the body 101 than the mixing chamber 110. At a channel connecting the separation chamber 120 to the mixing chamber 110, a first valve 152 may be installed.

The first valve 152 may be a normally dosed valve for closing the channel to prevent a fluid from flowing until it receives energy from outside and opens.

The normally dosed valve may include a valve material that is in a solid state at room temperature. The valve material may exist in a solidified state in the channel to dose the channel. The valve material may be molten at high temperature to move to a space in the channel, and open the channel, and after the channel opens, the valve material may be again coagulated. The energy received from the outside may be, for example, an electromagnetic wave or heat of high-temperature. An energy source may be a laser light source that irradiates a laser beam, a light-emitting diode that irradiates visible light or infrared light, a Xenon lamp, or a heating element. When a laser light source is used, the laser light source may include at least one laser diode.

An external energy source may be selected according to a wavelength of an electromagnetic wave that heating particles included in the valve material may absorb. As the valve material, a thermoplastic resin, such as cyclic olefin copolymer (COC), polymethylmethacrylate (PMMA), polycarbonate (PC), polystyrene (PS), polyoxymethylene (POM), perfluoralkoxy (PFA), polyvinylchloride (PVC), polypropylene (PP), polyethylene terephthalate (PET), polyetheretherketone (PEEK), polyamide (PA), polysulfone (PSU), and polyvinylidene fluoride (PVDF), may be adopted. Also, as the valve material, a phase-transition material which is in a solid state at room temperature may be adopted.

The phase-transition material may be wax. When wax is heated, the wax may be molten to change to a liquid state so that the volume expands. The wax may be, for example, paraffin wax, microcrystalline wax, synthetic wax, or natural wax. The phase-transition material may be a gel or a thermoplastic resin.

The gel may be polyacrylamide, polyacrylates, polymethacrylates, or polyvinylamides. A plurality of micro heating particles that emit heat by absorbing electromagnetic wave energy may be dispersed in the valve material. The micro heating particles may have a diameter of 1 nm to 100 μm to freely pass through a micro channel having a depth of about 0.1 mm and a width of about 1 mm. The micro heating particles may have a property that its temperature rises sharply to emit heat when energy is supplied to the micro heating particles by, for example, laser light or a heating element, and a property of being dispersed uniformly in wax. For the micro heating particles to have the properties, the micro heating particles may include a core including a metal component and a hydrophobic surface structure. For example, the micro heating particles may have a molecular structure including a core made of iron (Fe) and a plurality of surfactants combined with the iron (Fe) and surrounding the iron (Fe).

The micro heating particles may be stored in a state of being dispersed in carrier oil. The carrier oil may also have hydrophobicity to uniformly disperse the micro heating particles having the hydrophobic surface structure. By pouring the carrier oil in which the micro heating particles are dispersed into the molten phase-transition material, mixing the molten phase-transition material with the carrier oil, injecting the mixture into the channel, and then coagulating the mixture, the channel may be closed.

However, the micro heating particles are not limited to polymer particles mentioned above as examples, and may be in the form of quantum dots or magnetic beads. Also, the micro heating particles may be micro metal oxides, such as, for example, $Al_2O_3$, $TiO_2$, $Ta_2O_3$, $Fe_2O_4$, $Fe_3O_4$, or $HfO_2$. Meanwhile, the closed valve may not necessarily include the micro heating particles, and may consist of only a phase-transition material without micro heating particles.

The sample S including the first material and the second material mixed with the magnetic beads MB in the mixing chamber 110 may be transferred to the separation chamber 120 by opening the first valve 152 while rotating the body 101 to apply a centrifugal force.

In the separation chamber 120, the first material may be separated from the second material combined with the magnetic beads MB. For this, the separation chamber 120 may include a first space 122, a second space 126, and a partition wall 124 positioned between the first space 122 and the second space 126.

The first space 122 may be connected to the mixing chamber 110, and the sample S entered from the mixing chamber 110 may be positioned in the first space 122 (see FIG. 3A and FIG. 4A).

The second space 126 may be positioned farther away from a rotation axis which is the center of the body 101 than the first space 122, and the first space 122 may be partitioned from the second space 126 by the partition wall 124. The partition wall 124 partitioning the first space 122 from the second space 126 may have an inclined surface 124a toward the first space 122, and a top surface 124b extending from a top edge of the inclined surface 124a toward the second space 126.

A height of the top surface 124b may be lower than heights of the first space 122 and the second space 126. Accordingly, when the sample S positioned in the first space 122 receives a centrifugal force, a heavy material in the sample S may be transferred to the second space 126, and, in the first space 122, a relatively light material may remain.

The inclined surface 124a of the partition wall 124 may cause the heavy material in the sample S existing in the first space 122 to be easily transferred to the second space 126.

As another embodiment, the separation chamber 120 may be configured with the first space 122 and the second space 126 without the partition wall 124. To easily separate a target material from a material to be separated combined with magnetic beads, a density gradient medium (DGM) may be included in the sample S or the separation chamber 120. The density gradient medium (DGM) may be a material having higher density than the first material that is the target cell T and lower density than the magnetic beads MB in the separation chamber 120.

More specifically, as shown in FIG. 5A, the density gradient medium (DGM) may be prepared in the second space 126 of the separation chamber 120. Thereby, when the sample S is supplied into the first space 122, the first space 122 may be partitioned from the second space 126 although there is no partition wall 124.

In this case, the sample S may be mixed with the magnetic beads MB in the mixing chamber 110 to include the first material being the target cell T and the second material being a mixture (T+MB) of a non-target cell and the magnetic beads MB. Thereafter, as shown in FIG. 5B, when a centrifugal force is applied although the first space 122 is not physically partitioned from the second space 126, a heavy material in the sample S may be transferred to the second space 126, and, in the first space 122, a relatively light material may remain. Due to such a density gradient, the first material which is a light target cell may remain in the first space 122, and, in the second space 126, the second material combined with the magnetic beads MB may remain so that the first material may be separated from the second material. Particularly, through the density gradient medium (DGM) positioned between the first material and the second material in the separation chamber 120 and having higher density than the first material and lower density than the magnetic beads MB, the first material may be effectively separated from the second material.

Meanwhile, according to an embodiment of the disclosure, the magnetic member 140 may be positioned on one side of the body 101 and spaced from the separation chamber 120. The magnetic member 140 may be adjacent to the second space 126, and have a width and height extending in a vertical direction to have the same height as that of the second space 126. The magnetic member 140 may be positioned farther away from the center of rotation of the body 101 than the separation chamber 120. A magnetic force, shape, and position of the magnetic member 140 may be experimentally selected.

In the current embodiment, the magnetic member 140 may be a permanent magnet. When the second material combined with the magnetic beads MB is separated from the first material, the magnetic member 140 may operate together with a centrifugal force, while the centrifugal force is applied to the body 101, to cause the second material combined with the magnetic beads MB to quickly enter the second space 126. For example, to more efficiently generate a magnetic force than a case of using a permanent magnet, a Halbach array magnet may be used as the magnetic member 140.

Also, as another example, the magnetic member 140 may be formed as an electromagnet to adjust an intensity of a magnetic force. As such, when the magnetic member 140 is formed as an electromagnet, the electromagnet may generate a magnetic force when the magnetic force is needed to cause the magnetic force to more easily separate a sample in the separation chamber 120, and, when no magnetic force is needed, the electromagnet may prevent a magnetic force from being generated. In this way, the magnetic member 140 may adjust an intensity of a magnetic force as necessary.

In an embodiment of the disclosure, when a centrifugal force and a magnetic force are applied in the separation chamber 120, the first material may remain in the first space 122, and the second material combined with the magnetic beads MB may remain in the second space 126 so that the first material is separated from the second material (operation S30 of FIG. 2) (see FIG. 3B and FIG. 4B). In this case, in the current embodiment, various materials as well as the first material and the second material may exist in the sample. The various materials may be not combined with the magnetic beads MB, and exist in the first space 122 or be transferred to the second space 126 to exist in the second space 126 while the body 101 rotates by a centrifugal force.

Meanwhile, the separation chamber 120 may be connected to the storage chamber 130. Accordingly, the first material separated in the separation chamber 120 may be stored in the storage chamber 130.

Referring to FIG. 1 and FIGS. 3A to 3C, an entrance of the channel connecting the storage chamber 130 to the separation chamber 120 may be positioned on the top surface 124b of the partition wall 124 between the first space 122 and the second space 126. At the channel connecting the storage chamber 130 to the separation chamber 120, a second valve 154 may be installed. The storage chamber 130 may be positioned farther away from a center of the rotation axis than the first space 122.

According to an embodiment of the disclosure, when the second valve 154 opens and the body 101 rotates after the first material is separated from the second material in the separation chamber 120 (see FIG. 3B and FIG. 4B), the first material may enter the storage chamber 130 to be stored inside the storage chamber 130 separately from the second material (operation S40 of FIG. 2) (see FIG. 3C). As such, when the first material, that is, the target cell T is stored inside the storage chamber 130, a task of separating the target cell T may terminate.

FIG. 6 is a graph for comparing an amount of the second material remaining in the first space when a centrifugal force and a magnetic force are simultaneously applied to the microfluidic apparatus according to an embodiment of the disclosure (Magnet W) to an amount of the second material remaining in the first space when no magnetic force is applied to the microfluidic apparatus (Magnet W/O), and Table 1 is numerical data of the graph of FIG. 5.

TABLE 1

|        | Magnet W | Magnet W/O |
|--------|----------|------------|
| 10 sec | 602.7    | 8331       |
| 30 sec | 465      | 4695       |
| 1 min  | 338      | 2497.7     |
| 2 min  | —        | 1215.3     |

To derive experimental results shown in Table 1. an inventor of the disclosure performed an experiment below.
I. Process of separating Dorsal Root Galion (DRG) neuron cells
1. DRGs located along both ends of a spine of a mouse embryo at a thirteenth day of pregnancy were taken out of the spine.
2. To separate the DRGs into individual cells, the DRGs were put in Dulbecco's phosphate buffered saline (DPBS) processed with 2.5% Trypsin-EDTA at 37 degrees for 15 minutes (water bath).
3. The resultant media was transferred to 10% FBS DMEM.
4. The media was filtered by using a cell strainer, and the media passed through the cell strainer was centrifuged at 1300 rpms for 3 minutes.
5. The supernatant was removed, and pellets were again released in neuron growth media that is less than 1 ml.
II. Separation (purification) process through the microfluidic apparatus.

1. NG media including cells separated through the above-described process was put in the mixing chamber of the microfluidic apparatus, together with antibody-coated-magnetic beads (a) of a 2.8 um size prepared in advance. The total volume was kept preferably within 1 ml.
2. By shaking the NG media from side to side for 15 minutes, a time for the beads to sufficiently react with the cells was given.
3. Thereafter, through a rotation at 1000 rpms, the mixed solution was transferred to the separation chamber.
4. Thereafter, by rotating the microfluidic apparatus at speed of 220 g (RCF) for 2 minutes, Schwann cells, Fibroblast, and Epitheial cells, combined with the beads, were collected in the second space of the separation chamber by a centrifugal force and a magnetic force. Because neuron cells have lower density than Percoll which is a density gradient medium put in advance in the separation chamber, the neuron cells could not move to the second space, and remained in the first space above the Percoll.
5. Only the supernatant above the Percoll was transferred to the storage chamber which is the next chamber.
6. The neuron cells purified and collected in the storage chamber were collected and cultivated.

In an embodiment of the disclosure, the magnetic beads need to have higher density than the cells, that is, the first material and the second material. For example, a sufficiently large amount of 2.8 um beads compared to a number of the second material may be put such that the beads can be combined with the second material at a ratio of a pre-set range. For example, the magnetic beads may be combined with the second material at a ratio of 1:10 to 1:5000, preferably, at a ratio of 1:50 to 1:100. As a kind of a coating material, a CD-9 antibody for specific binding with Schwann cells may be used, and, to remove Fibroblast and epithelial cells, Bandeiraea simplicifolia lectin 1 (BSL1) may be used. Finally manufactured antibody-coated magnetic beads may be stored in Phosphate Buffered Saline (PBS) including 0.1% bovine serum albumin.

The Percoll is used to form a density gradient, and may have higher density than neuron cells (a maximum of 1.077 g/ml) and lower density than the magnetic beads (1.3 g/ml). Because the density of cells combined with magnetic beads is higher than that of the Percoll, the cells are positioned below the Percoll, that is, in the second space when a density gradient is formed by a centrifugal force. The phenomenon is accelerated by a magnet. Although a volume of the Percoll put in the separation chamber varies depending on the body volume of the microfluidic apparatus, the volume of the Percoll does not exceed 400 ul such that the Percoll is not transferred to the storage chamber.

Referring to FIG. 6 and Table 1, in a case in which a centrifugal force is generated in the separation chamber 120 to separate the first material from the second material, 1000 or less second materials combined with the magnetic beads MB remained in the first space 122 after 10 seconds when a magnetic force is applied simultaneously with the centrifugal force, whereas 8000 or more second materials combined with the magnetic beads MB remained in the first space 122 after 10 seconds when no magnetic force is applied. Also, an amount of second materials remaining in the first space 122 after 30 seconds when the magnetic force and the centrifugal force were simultaneously applied was about one tenth of an amount of second materials remaining in the first space 122 after 30 seconds when only the centrifugal force was applied while no magnetic force was applied. Also, no second material remained in the first space 122 after 2 minutes when the magnetic force and the centrifugal force were simultaneously applied, whereas 1000 or more second materials were detected in the first space 122 after 2 minutes when only the centrifugal force was applied while no magnetic force was applied.

When the second material is removed by using the microfluidic apparatus according to an embodiment of the disclosure, the second material may be removed preferably by 80% or more from the sample, although not limited thereto. For this, when the centrifugal force and the magnetic force are simultaneously used, it may be preferable to operate the microfluidic apparatus for at least 20 seconds to a maximum of 5 minutes, although not limited thereto.

Also, in an embodiment of the disclosure, the magnetic force applied to separate the second material, simultaneously with the centrifugal force, may have a magnitude of at least 20% or more of the centrifugal force, although not limited thereto.

According to an embodiment of the disclosure, when the magnetic force and the centrifugal force are simultaneously applied to the second material to separate the second material, the magnetic force and the centrifugal force may be applied in the same direction. Therefore, a resultant force of the magnetic force and the centrifugal force may be a magnitude of a force that is applied to the second material.

In this case, the magnitudes of the centrifugal force and the magnetic force, which are applied to the second material, an optimal magnitude ratio of the centrifugal force and the magnetic force, and an optimal application time of the magnetic force and the centrifugal force may be experimentally selected.

The microfluidic apparatus according to an embodiment of the disclosure may apply a magnetic force capable of reducing a time taken to separate the second material by at least 20% or more, compared to the case of separating the second material by using only a centrifugal force without a magnetic force, thereby reducing a time taken to separate the second material. Therefore, according to an embodiment of the disclosure, the first material may be prevented from being damaged due to a centrifugal force applied to the second material for a long time. In this case, the time taken to separate the second material, etc. may be appropriately selected by a magnitude of a centrifugal force depending on a rotation speed of the microfluidic apparatus, a magnitude of a magnetic force, etc.

As described above, the microfluidic apparatus according to an embodiment of the disclosure may separate a target material more quickly than the case of separating the target material by using only a centrifugal force, thereby enhancing separating efficiency of the target material.

Also, because a centrifugal force is applied for a short time to separate the target material, it may be possible to minimize damage of the target material by an external force due to a centrifugal force applied to the target material for a long time.

Meanwhile, to easily separate a target material from a material to be separated combined with magnetic beads in the microfluidic apparatus according to an embodiment of the disclosure, a DGM may be additionally included in the sample or the separation chamber. For example, inside the mixing chamber, a specific material and the other material in the sample may be positioned in different layers by using a centrifuging method and the DGM. As such, by variously combining a separation method using a DGM with the separation method according to the current embodiment using a centrifugal force and a magnetic force, target cells may be separated quickly and effectively according to their properties.

By using the microfluidic apparatus according to an embodiment of the disclosure to combine the second material not the target material with the magnetic beads and quickly separate a material to be separated combined with the magnetic beads from the target material by a centrifugal material and a magnetic material, the target material may be effectively separated even though it is a small amount or it is a material that is easily damaged due to an external force.

In an embodiment of the disclosure, the first material is a neuron cell, and the second material is a Schwann cell, Fibroblast, etc. However, kinds of materials and cells that may be separated by using the microfluidic apparatus according to an embodiment of the disclosure are not limited to these. It will be understood by one of ordinary skill in the art that various materials may be separated by using the microfluidic apparatus according to an embodiment of the disclosure.

So far, an embodiment of the disclosure has been described. However, the concept of the disclosure is not limited to the embodiment proposed in the current specification, and those skilled in the art who understand the concept of the disclosure can easily suggest other embodiments by adding, changing, deleting, and adding components within the scope of the same concept. Although this may be done, this also falls within the scope of the concept of the present disclosure.

INDUSTRIAL APPLICABILITY

According to the disclosure, a microfluidic apparatus is provided. Also, the embodiment of the disclosure may be applied to a target cell separation technique for separating target cells in biological samples, etc. that are industrially used.

I claim:
1. A microfluidic apparatus for separating a first material from a biological sample in which the first material and a second material are comprised, the microfluidic apparatus comprising:
 a body rotatable on a rotation axis which is a virtual line along which the body rotates;
 a mixing chamber included in the body, wherein magnetic beads are inserted into the mixing chamber in a predetermined amount along with the biological sample, and the magnetic beads are mixed with the biological sample in the mixing chamber to be combined with the second material;
 a separation chamber included in the body and connected to the mixing chamber, wherein the separation chamber is positioned farther away from the rotation axis than the mixing chamber, and wherein the first material is separated from the second material combined with the magnetic beads in the separation chamber;
 s storage chamber included in the body and connected to the separation chamber;
 a magnetic member positioned on one side of the body outside the separation chamber; and
 a first channel connecting the storage chamber to the separation chamber, wherein, in the separation chamber, the first material is separated from the second material combined with the magnetic beads by a centrifugal force and a magnetic force,
 wherein the separation chamber comprises:
 a first space;
 a second space farther away from the rotation axis than the first space; and a partition wall formed between the first space and the second space, wherein the partition wall includes an inclined surface inclined upward toward the first space, wherein the first material is positioned in the first space, and the second material combined with the magnetic beads and separated from the first material by the centrifugal force and the magnetic force is positioned in the second space, wherein the first channel comprises an entrance disposed between the first space and the second space to collect the first material.

2. The microfluidic apparatus of claim 1, further comprising a second channel connecting the mixing chamber to the separation chamber; and a first valve installed in the second channel.

3. The microfluidic apparatus of claim 1, wherein the partition wall includes a top surface formed as a flat surface extending from a top edge of the inclined surface toward the second space.

4. The microfluidic apparatus of claim 1, further comprising a second valve installed in the first channel connecting the storage chamber to the separation chamber.

5. The microfluidic apparatus of claim 3, wherein an entrance of the first channel is connected to a space above the partition wall.

6. The microfluidic apparatus of claim 5, wherein the magnetic member is positioned outside the separation chamber in a radial direction with respect to the separation chamber, the magnetic member having the same height as the separation chamber.

7. The microfluidic apparatus of claim 1, wherein the centrifugal force and the magnetic force are applied radially outward of the rotation axis.

\* \* \* \* \*